United States Patent
Chen et al.

(10) Patent No.: US 8,300,150 B2
(45) Date of Patent: Oct. 30, 2012

(54) IMAGE PROCESSING APPARATUS AND METHOD

(75) Inventors: Chien-Chen Chen, Taipei (TW); Chun-Hsing Hsieh, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 440 days.

(21) Appl. No.: 12/573,808

(22) Filed: Oct. 5, 2009

(65) Prior Publication Data

US 2010/0085486 A1    Apr. 8, 2010

(30) Foreign Application Priority Data

Oct. 7, 2008   (TW) ............................... 97138573 A (51) Int. Cl.
*H04N 5/00* (2006.01)
(52) U.S. Cl. .......... 348/607; 348/21; 348/241; 348/533; 348/683; 348/701
(58) Field of Classification Search ............. 375/240.01–240.29; 348/572–712, 348/21, 241, 533
See application file for complete search history.

(56) References Cited

U.S. PATENT DOCUMENTS

| | | | |
|---|---|---|---|
| 4,240,106 A | 12/1980 | Michael et al. | |
| 6,061,100 A | 5/2000 | Ward et al. | |
| 2006/0188018 A1* | 8/2006 | Lin | 375/240.16 |
| 2009/0268096 A1* | 10/2009 | Lin et al. | 348/699 |

* cited by examiner

*Primary Examiner* — Sath V Perungavoor
*Assistant Examiner* — Nathnael Aynalem
(74) *Attorney, Agent, or Firm* — Thomas, Kayden, Horstemeyer & Risley, LLP (57) ABSTRACT

An image processing apparatus includes a pixel difference calculator, a summing unit, a determining unit, and an output unit. The pixel difference calculator receives a present image having first pixels and a previous image having second pixels, calculates pixel differences between corresponding first and second pixels, and outputs positive and negative pixel difference values. The summing unit obtains a first output value by adding up those of the positive pixel difference values and a second output value by adding up those of the negative pixel difference values. The determining unit determines a noise level of the present image from the first and second output values, and outputs a blended value. The output unit adds together weights of pixels at the same positions of the present and previous images according to the blended value to generate an output image. An image processing method is also disclosed.

12 Claims, 13 Drawing Sheets

IMAGE PROCESSING APPARATUS AND METHOD

CROSS-REFERENCE TO RELATED APPLICATION

This application claims priority of Taiwanese Application No. 097138573, filed on Oct. 7, 2008.

BACKGROUND OF THE INVENTION

1. Field of the Invention

The present invention relates to an image processing apparatus and method, more particularly to an image processing apparatus and method for determining whether noise is present in image data.

2. Description of the Related Art

The quality requirements for video content are continuously being raised as a result of the rapid advances in signal processing technology. Video content with high picture quality and high resolution is already being widely used in various types of image display apparatuses, such as high-definition televisions (HDTVs), LCD monitors for personal computers, etc.

Video content typically includes a plurality of frames or fields. During processing or transmission of video signals, it is common for some of the frames or fields to be affected by noise to thereby undergo change (e.g., some pixel values change). High-resolution display apparatuses are more sensitive to noise in video content. That is, when video content is subjected to noise interference, the effect is more pronounced in high-resolution display apparatuses, such that the quality of the video content is reduced. Therefore, the determination of the level of noise and ways in which noise may be suppressed or eliminated are critical issues in the area of video processing technology.

Mean absolute difference (MAD) is a commonly used technique for determining whether video content is being subjected to noise. The formula for MAD is as shown in the following Formula (F1):

$$MAD(dx, dy) = \frac{1}{m \cdot n} \sum_{i=0}^{n} \sum_{j=0}^{m} |P_k(i, j) - P_{k-1}(i, j)| \quad (F.1)$$

where m and n are resolution dimensions of video content, $P_k(i,j)$ is a pixel value of a pixel at position (i,j) of a kth frame, and $P_{k-1}(i,j)$ is a pixel value of a pixel at position (i,j) of a (k−1)th frame. "Pixel value" refers to the luminance value (luma) or the chromatic value (chroma) of a pixel.

Figure 1:
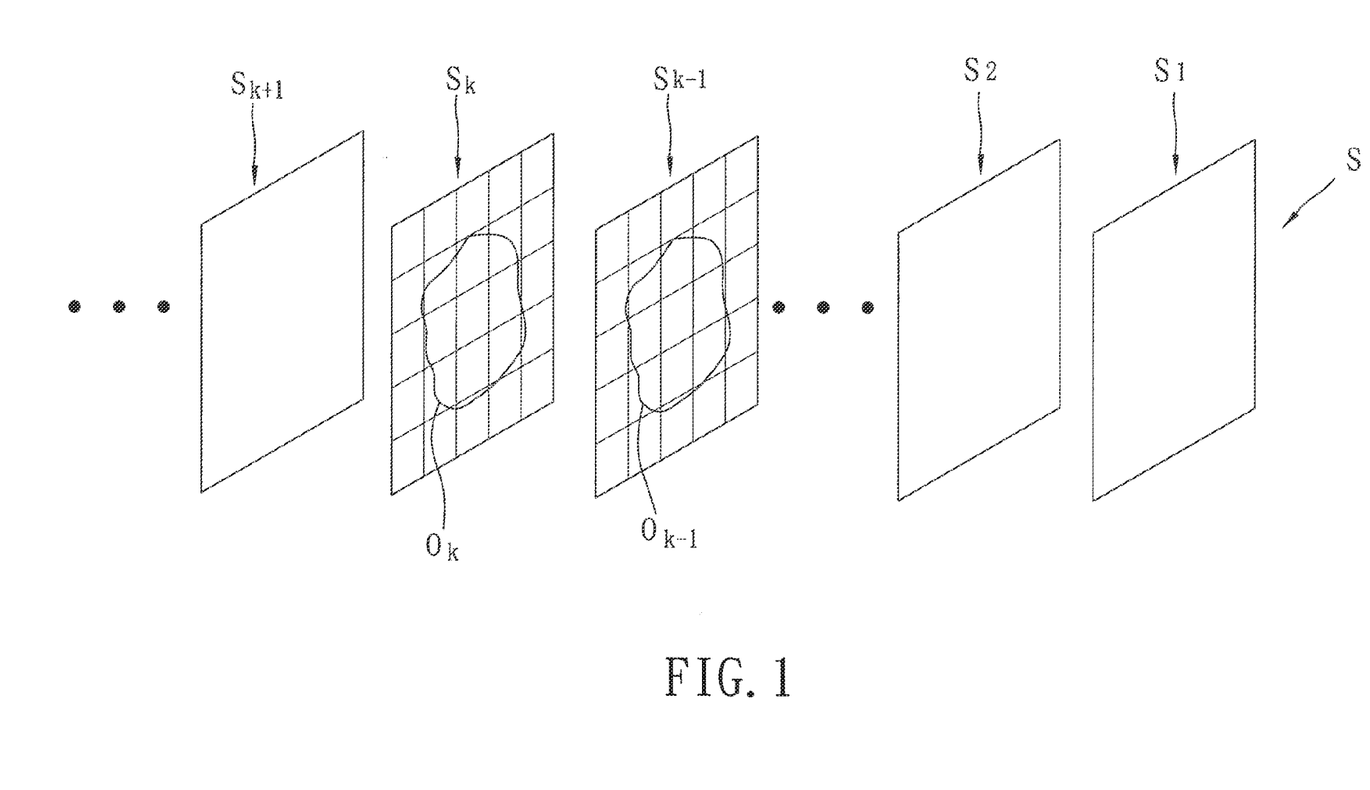
FIG. 1 is a schematic diagram of a frame sequence.

An example is provided with reference to FIG. 1. In a consecutive frame sequence (S) including frame $S_1$, $S_2$ . . . $S_{k-1}$, $S_k$, $S_{k+1}$, etc., if an object $O_k$ in the frame $S_k$ is not moved relative to an object $O_{k-1}$ in the frame $S_{k-1}$, then in theory each pixel value in the frame $S_k$ will be the same as the pixel value in a corresponding location in the frame $S_{k-1}$, and therefore, a MAD value of zero is calculated using Formula (F1).

Figure 2:
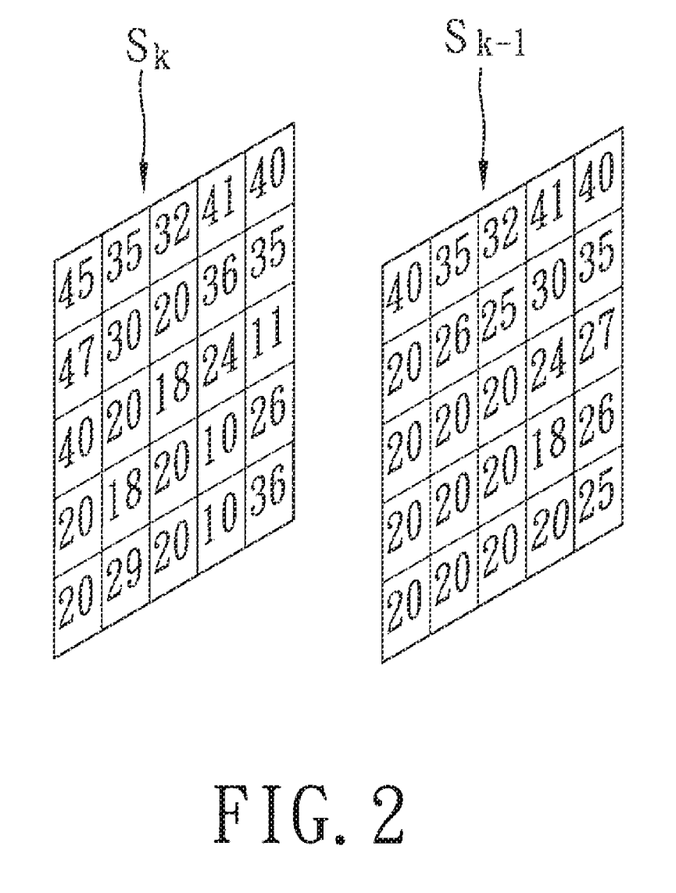
FIG. 2 is a schematic diagram for illustrating how pixel values of an image are affected by noise interference.

If noise is present in the frame $S_k$, then at least one pixel value in the frame $S_k$ is changed. Referring to FIG. 2, ignoring any affect due to dynamic imaging (i.e., movement in an image) and assuming that a pixel value (s) in the frame $S_k$ changed as a result of signal nose, then $MAD_{noise}$ may be calculated based on Formula (F1) as follows:

$$MAD_{noise} = $$
$$\frac{1}{5.5}[|45 - 40| + |35 - 35| + |32 - 32| + |41 - 41| + |40 - 40| + |47 - 20| +$$
$$|30 - 26| + |20 - 25| + |36 - 30| + |35 - 35| + |40 - 20| +$$
$$|20 - 20| + |18 - 20| + |24 - 24| + |11 - 27| + |20 - 20| +$$
$$|18 - 20| + |20 - 20| + |10 - 18| + |26 - 26| + +|20 - 20| +$$
$$|29 - 20| + |20 - 20| + |10 - 20| + |36 - 25|] = 5$$

The larger the value of MAD, the greater the amount of noise, that is, the greater the influence of noise on the pixels. Conversely, the lower the value of MAD, the smaller the amount of noise, that is, the smaller the influence of noise on the pixels. Hence, in the prior art, the presence of noise is determined according to how high or low the value of MAD is.

Figure 3:
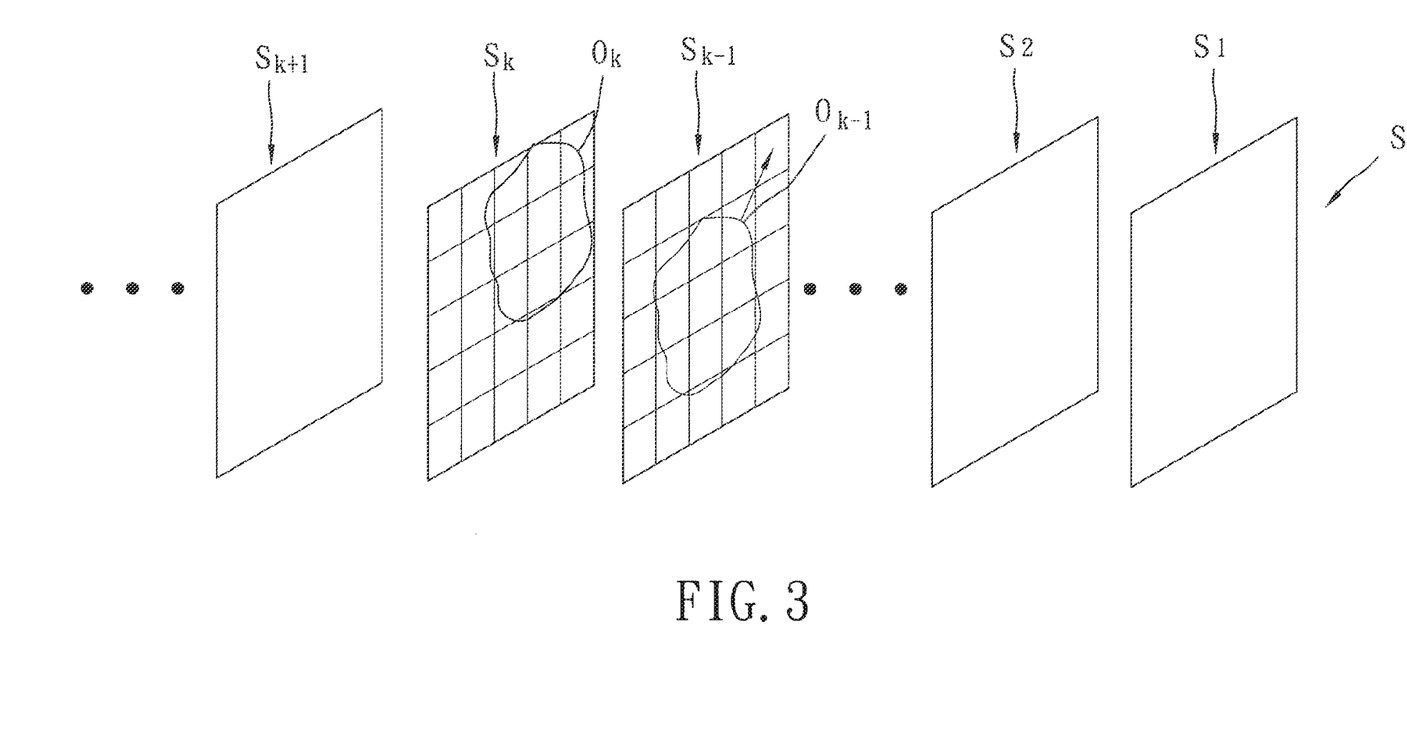
FIG. 3 is a schematic diagram of a frame sequence including a moving object.
Figure 4:
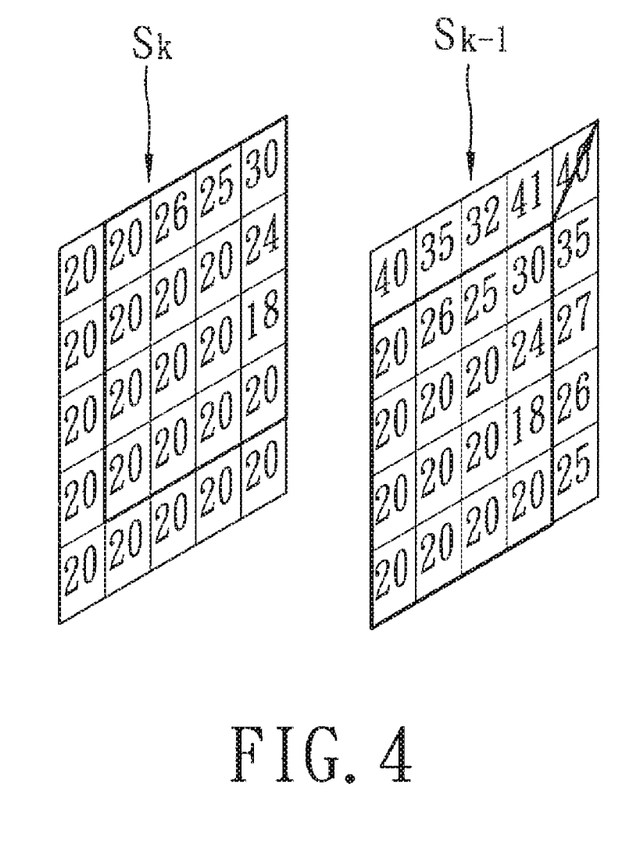
FIG. 4 is a schematic diagram for illustrating pixel values of an image that includes a moving object.

Referring to FIGS. 3 and 4, if it is assumed that an object $O_k$ in the frame $S_k$ is moved relative to an object $O_{k-1}$ in the frame $S_{k-1}$, then $MAD_{motion}$ is calculated as follows:

$$MAD_{motion} = $$
$$\frac{1}{5.5}[|20 - 40| + |20 - 35| + |26 - 32| + |25 - 41| + |30 - 40| + |20 - 20| +$$
$$|20 - 26| + |20 - 25| + |20 - 30| + |24 - 35| + |20 - 20| +$$
$$|20 - 20| + |20 - 20| + |20 - 24| + |18 - 27| + |20 - 20| +$$
$$|20 - 20| + |20 - 20| + |20 - 18| + |20 - 26| + +|20 - 20| +$$
$$|20 - 20| + |20 - 20| + |20 - 20| + |20 - 25|] = 5$$

From the foregoing, it is evident that with respect to the frame $S_k$, there is no difference between $MAD_{noise}$ occurring when there is noise and $MAD_{motion}$ occurring when there is object movement in a frame. Hence, using the conventional determination method, it is not possible to determine whether differences in pixel values between a current image and a previous image are due to noise interference or dynamic imaging.

When movement in an image is mistaken for noise interference, loss of image fidelity will occur. Since MAD is the result of object movement during dynamic imaging, each pixel value in the frame $S_k$ is not necessarily related to the previous frame $S_{k-1}$. For example, due to object movement, pixel (i,j) may be part of an object in the frame $S_{k-1}$, while the same pixel (i,j) may be part of the background in the frame $S_k$. If this is mistaken for noise interference, and mean processing is performed for the pixel values of the previous and subsequent images in order to cancel the noise, the end result may be image streaking.

SUMMARY OF THE INVENTION

Therefore, the object of the present invention is to provide an image processing apparatus and method that can determine whether noise is present in an image and thereby solve the problem of erroneous determination in the prior art.

According to one aspect, the image processing apparatus of this invention comprises: a pixel difference calculator receiving a present image having a plurality of first pixels and a previous image having a plurality of second pixels, said pixel difference calculator calculating pixel differences between the first pixels and the second pixels which positions are corresponding to the first pixels, and outputting a plurality of pixel difference values, the pixel difference values including a plurality of positive pixel difference values and a plurality of negative pixel difference values; a summing unit coupled to said pixel difference calculator, and for obtaining a first output value by adding up those of the positive pixel difference values and a second output value by adding up those of the negative pixel difference values; a determining unit coupled to said summing unit, and for determining a noise level of the present image from the first output value and the second output value, and outputting a blended value; and an output unit coupled to said determining unit, and for adding up those of weights of pixels at the same positions of the present image and the previous image according to the blended value to generate an output image.

According to another aspect, the image processing method of this invention comprises: receiving a present image having a plurality of first pixels and a previous image having a plurality of second pixels; calculating pixel differences between the first pixels and the second pixels which positions are corresponding to the first pixels, and outputting a plurality of pixel difference values, the pixel difference values including a plurality of positive pixel difference values and a plurality of negative pixel difference values; obtaining a first output value by adding up those of the positive pixel difference values and a second output value by adding up those of the negative pixel difference values; determining a noise level of the present image from the first output value and the second output value, and outputting a blended value; and adding up those of weights of pixels at the same positions of the present image and the previous image according to the blended value to generate an output image.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

First Preferred Embodiment

Figure 5:
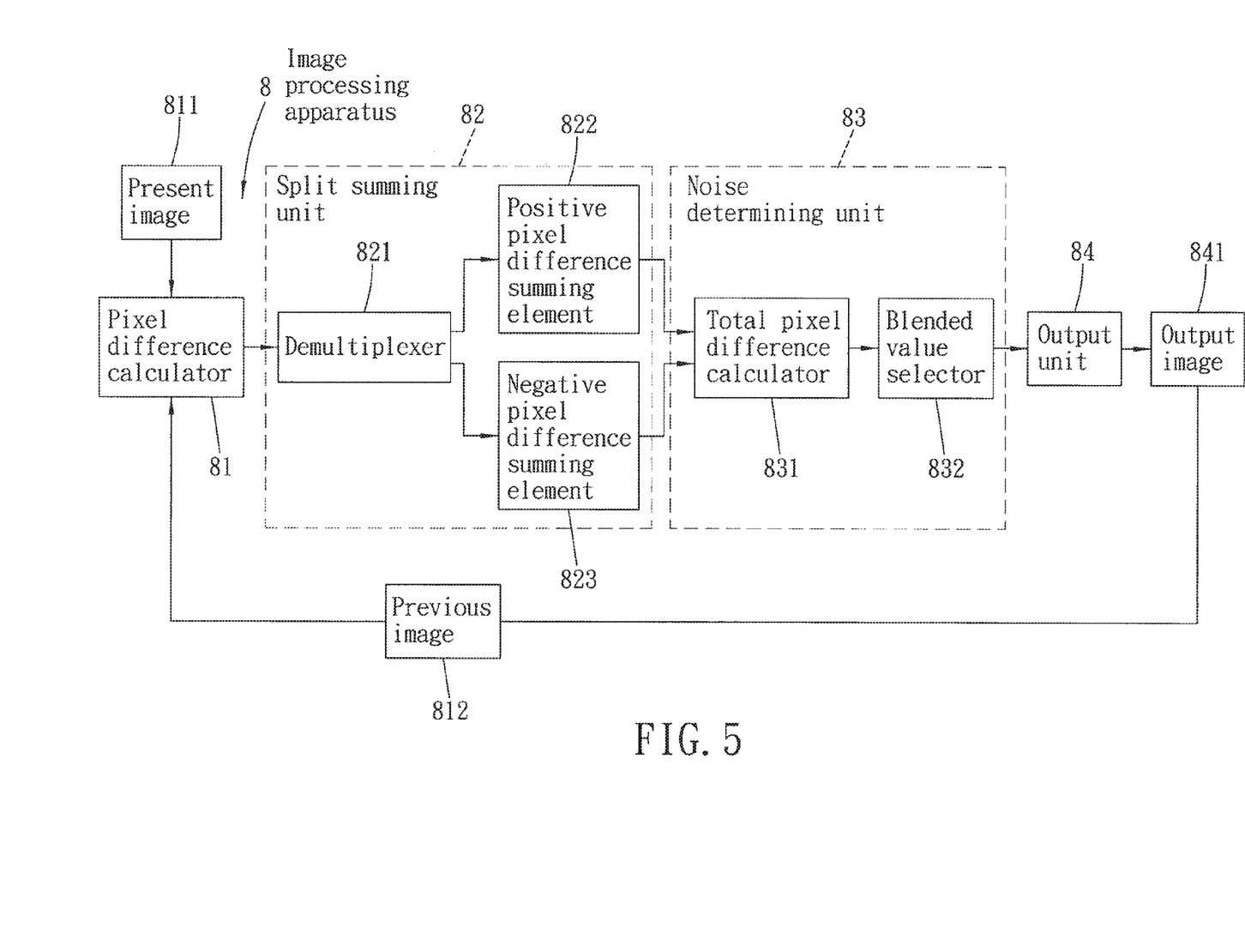
FIG. 5 is a schematic circuit block diagram of a first preferred embodiment of an image processing apparatus according to the present invention.

Referring to FIG. 5, the first preferred embodiment of an image processing apparatus 8 according to the present invention comprises a pixel difference calculator 81, a split summing unit 82, a noise determining unit 83, and an output unit 84.

The pixel difference calculator 81 receives a present image 811 and a previous image 812. Each of the present image 811 and the previous image 812 is a frame and has a plurality of pixels. Each pixel has a pixel value, which includes a luma and a chroma. For each pair of pixels at corresponding locations of the present image 811 and the previous image 812, the pixel difference calculator 81 calculates a pixel difference between pixel values of the pair of pixels, and collects all the pixel differences to form a pixel difference matrix 813. An example is provided with reference to FIG. 6.

Figure 6:
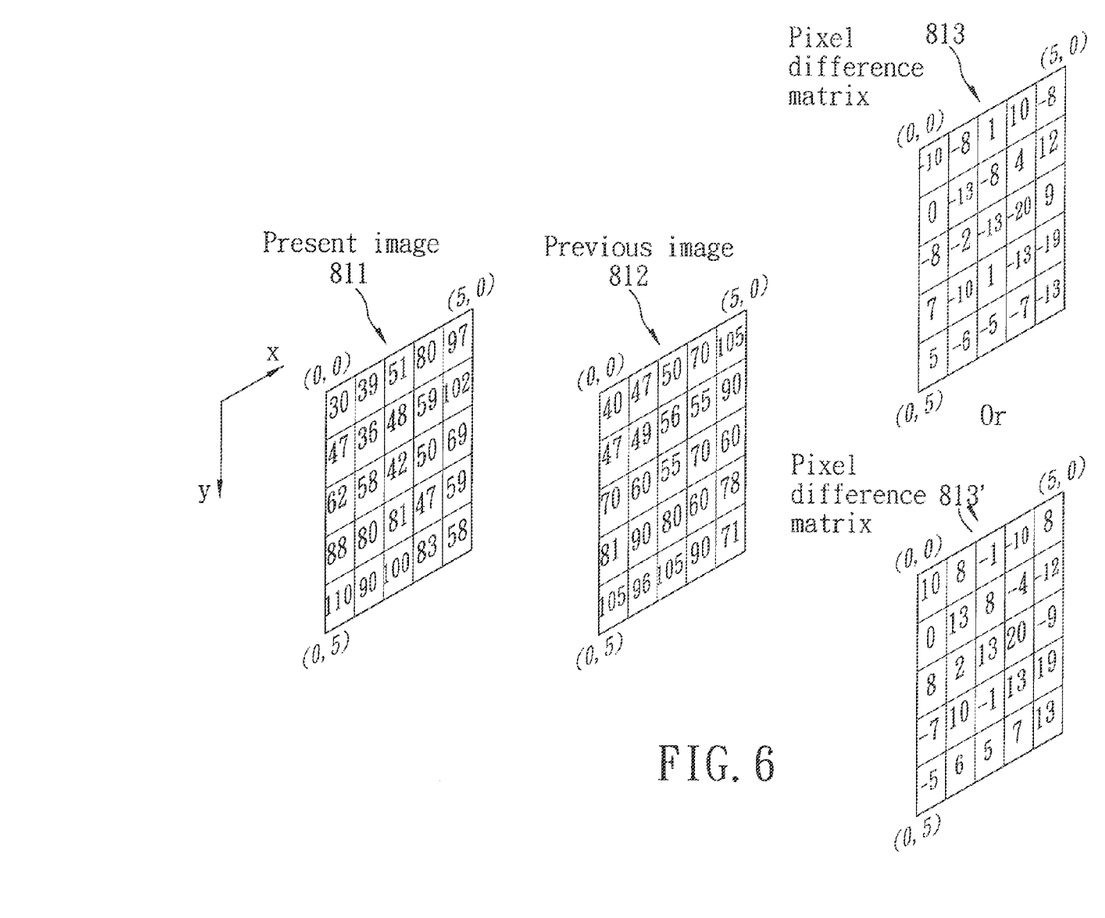
FIG. 6 is a schematic diagram used to describe an example of pixel difference matrix calculation according to the first preferred embodiment of the present invention.

In FIG. 6, when the pixel difference calculator 81 is configured to subtract pixel values of pixels of the previous image 812 from pixel values of corresponding pixels of the present image 811, then the pixel difference matrix 813 is the result. Alternatively, when the pixel difference calculator 81 is configured to subtract pixels values of pixels of the present image 811 from pixel values of corresponding pixels of the previous image 812, then the pixel difference matrix 813' is the result.

Referring back to FIG. 5, the split summing unit 82 includes a demultiplexer 821, a positive pixel difference summing element 822, and a negative pixel difference summing element 823.

Figure 7:
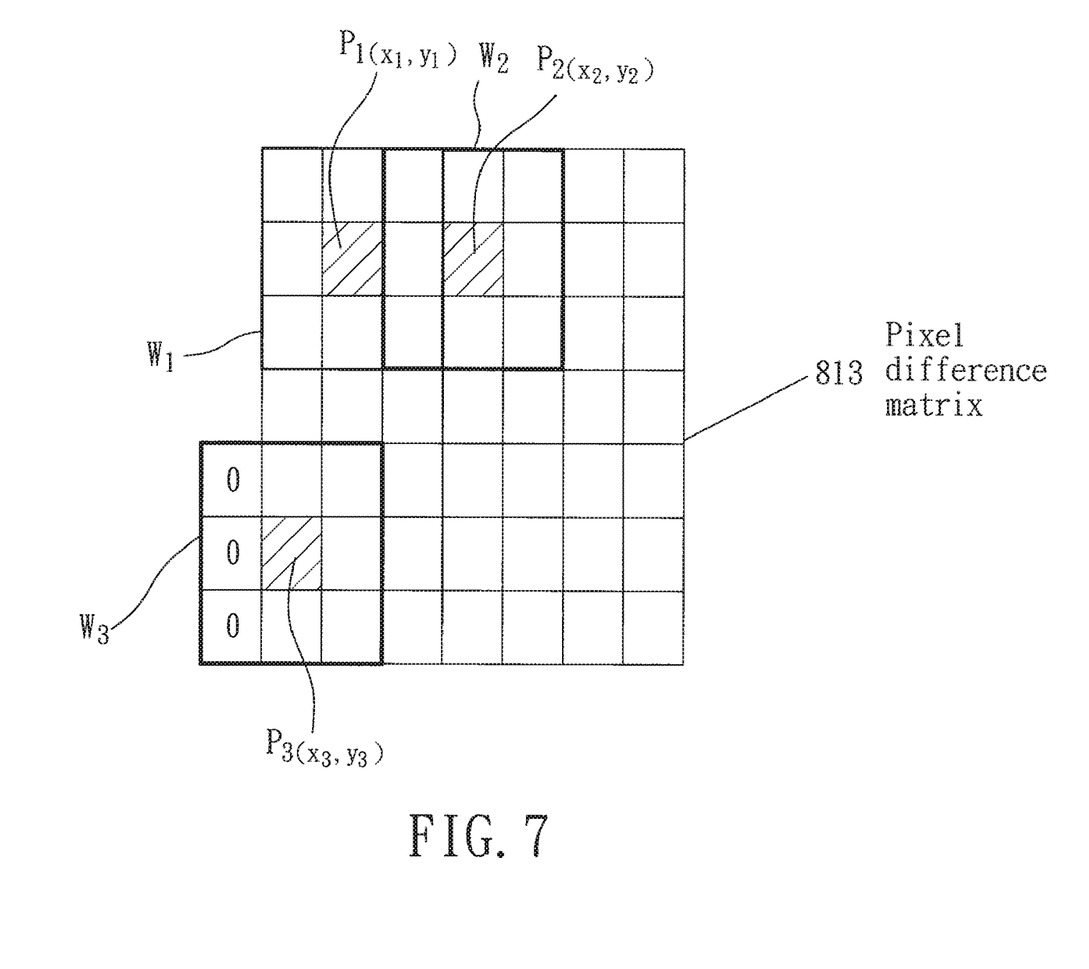
FIG. 7 is a schematic diagram for illustrating a sampling window of a pixel.

The split summing unit 82 establishes a sampling window centered about each pixel difference and of a predetermined sampling window size. For example, referring to FIG. 7, assuming a predetermined sampling window size of 3×3, for pixel differences $P_1$ and $P_2$, the corresponding sampling windows are $W_1$ and $W_2$, respectively. For a pixel difference at a boundary, such as pixel difference $P_3$, a value of "0" for portions that lie outside the image (i.e., outside the pixel difference matrix 813) may be used, such that a sampling window $W_3$ may still be established for pixel difference $P_3$. Since the previous frame has the same portion that lies outside the image, the processing result remains unaffected.

After the sampling windows are established, the split summing unit 82 adds the pixel differences in each sampling window according to sign. That is, for each sampling window, the demultiplexer 821 receives each pixel difference in the sampling window and determines whether the pixel difference is positive or negative. If the value of a pixel difference is positive, the demultiplexer 821 transmits the pixel difference to the positive pixel difference summing element 822, while if the value of a pixel difference is negative, the demultiplexer 821 transmits the pixel difference to the negative pixel difference summing element 823.

The positive pixel difference summing element 822 adds all received positive pixel differences belonging to a sampling window so as to generate a first output value. The negative pixel difference summing element 823 adds all received negative pixel differences belonging to a sampling window so as to generate a second output value. It is to be noted that the negative pixel difference summing element 823 performs an unsigned operation, and hence, the second output value is also positive.

Figure 8:
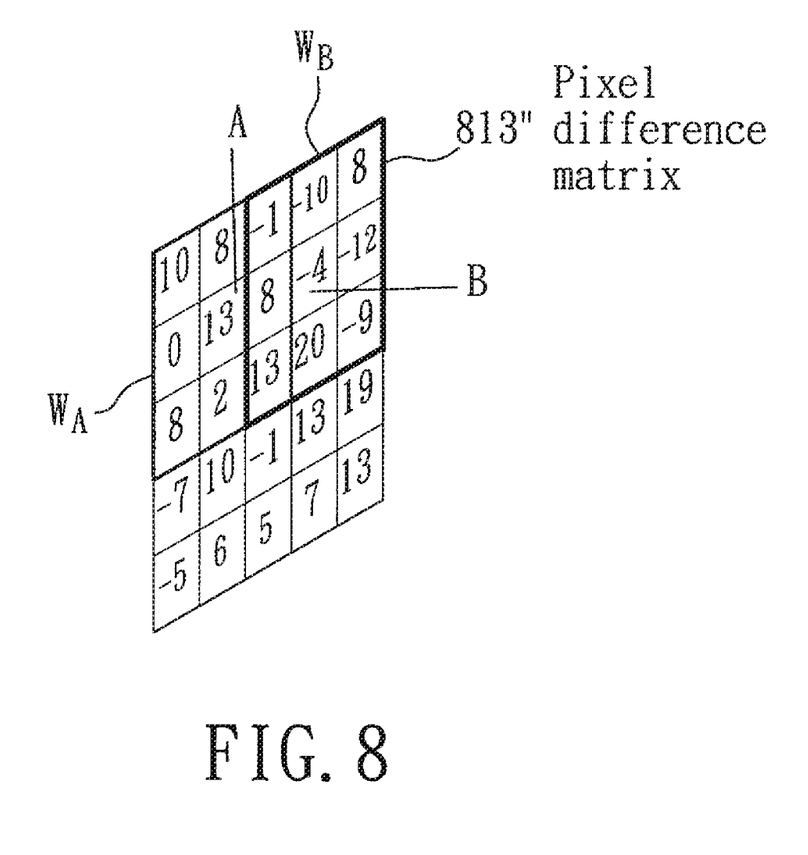
FIG. 8 is a schematic diagram for illustrating different pixel differences in a pixel difference matrix.

An example is provided with reference to FIGS. 6 and 8. In this example, it is assumed that a sampling window size is 3×3, and that pixel values of pixels of the present image 811 are subtracted from pixel values of corresponding pixels of the previous image 812 to thereby result in the pixel difference matrix 813''. Furthermore, for this example, pixel differences A, B have sampling windows $W_A$, $W_B$, respectively. After processing of the pixel differences in these two sampling windows $W_A$, $W_B$ by the split summing unit 82, first and second output values for each of the pixel differences A, B are calculated as follows:

First output value $A_1$ of pixel difference $A$=10+8+13+ 8+8+2+13=62

Second output value $A_2$ of pixel difference A=1

First output value $B_1$ of pixel difference $B$=8+8+13+ 20=49

Second output value $B_2$ of pixel difference $B$=1+10+ 4+12+9=36

Referring back to FIG. 5, the noise determining unit 83 receives the first and second output values of each pixel difference, and selects a blended value (K) of the pixels according to a logic operation result of the first and second output values. The noise determining unit 83 includes a total pixel difference calculator 831 and a blended value selector 832.

The total pixel difference calculator 831 calculates the difference between the first and second output values of each pixel difference so as to generate a total pixel difference (D), which indicates the level of noise interference that the pixel is subjected to. Referring to FIG. 8, the total pixel differences (D) of the pixel differences A, B are obtained as follows:

Total pixel difference($D_A$) of pixel difference $A$=first output value($A_1$)−second output value($A_2$)=62− 1=61

Total pixel difference($D_B$) of pixel difference $B$=first output value($B_1$)−second output value($B_2$)=49− 36=13

Referring again to FIG. 5, the blended value selector 832 receives the total pixel difference (D) of each pixel difference and determines the blended value (K) of the pixel according to the magnitude of the total pixel difference (D). In this embodiment, the blended value (K) is determined as described below.

Three threshold values of a first threshold value $TH_1$, a second threshold value $TH_2$, and a third threshold value $TH_3$ are preset in the blended value selector 832, in which the first threshold value $TH_1$ is smaller than the second threshold value $TH_2$ and the second threshold value $TH_2$ is smaller than the third threshold value $TH_3$. When the total pixel difference (D) of a pixel difference is smaller than the first threshold value $TH_1$, the blended value (K) of the pixel difference is set to 0.8. When the total pixel difference (D) of a pixel difference is larger than the first threshold value $TH_1$ and smaller than the second threshold value $TH_2$, the blended value (K) of the pixel difference is set to 0.5. When the total pixel difference (D) of a pixel difference is larger than the second threshold value $TH_2$ and smaller than the third threshold value $TH_3$, the blended value (K) of the pixel difference is set to 0.2.

An example is provided with reference to FIG. 8, in which it is assumed that the first threshold value $TH_1$, the second threshold value $TH_2$, and the third threshold value $TH_3$ are 20, 50, 100, respectively. As described above, for the example shown in FIG. 8, the total pixel difference ($D_A$) of the pixel difference (A) is 61, which is larger than the second threshold value $TH_2$ and smaller than the third threshold value $TH_3$. Therefore, the blended value selector 832 sets a blended value (K) of the pixel difference (A) to be 0.2. For the pixel difference (B), the total pixel difference ($D_B$) thereof is 13, which is smaller than the first threshold value $TH_1$. Therefore, the blended value selector 832 set a blended value (K) of the pixel difference (B) to be 0.8.

Typically, the majority of noise interference received by an image is random noise. Some of the pixel values in an image increase as a result of influence by random noise, while other pixel values decrease. In other words, a pixel receiving noise interference may have large first and second output values but typically does not have a very large total pixel difference. Compared to when there is a moving object in an image, since changes in the movement of an object in an image relative to movement of the background causes most pixels to undergo change in the same direction, one of the first and second output values of a moving pixel is frequently large and the other is small. Therefore, the total pixel difference is relatively large. As a result, the magnitude of the total pixel difference may be used to determine whether there is pixel movement or noise interference.

For actual implementation, it is noted that the presetting of the threshold values is not limited to what has been disclosed herein. Different numbers of threshold values, or a corresponding relation shown by a continuous function or a discrete function with variables of blended values (K) and pixel differences (D) may also be used to determine the threshold values.

Referring again to FIG. 5, the output unit 84 calculates an output pixel according to the blended value (K) of each pixel. After all the output pixels of the pixels are calculated, the output pixels are collected and used to form an output image 841 for output and feedback to the pixel difference calculator 81 for use as a previous image 812 in the next calculation. Each of the output pixels is calculated as shown in the following:

Output pixel=pixel value of the present image 811× (1−K)+corresponding pixel value of the previous image 812×K Referring to FIG. 8, the output values at the positions of the pixel differences (A), (B) of the output image are calculated as follows:

Output value of pixel difference($A$)=36×0.8+49× 0.2=38.6

Output value of pixel difference($B$)=59×0.2+55× 0.8=55.8

Second Preferred Embodiment

The second preferred embodiment according to this invention differs from the first preferred embodiment in that the second preferred embodiment performs processing with respect to fields.

Figure 9:
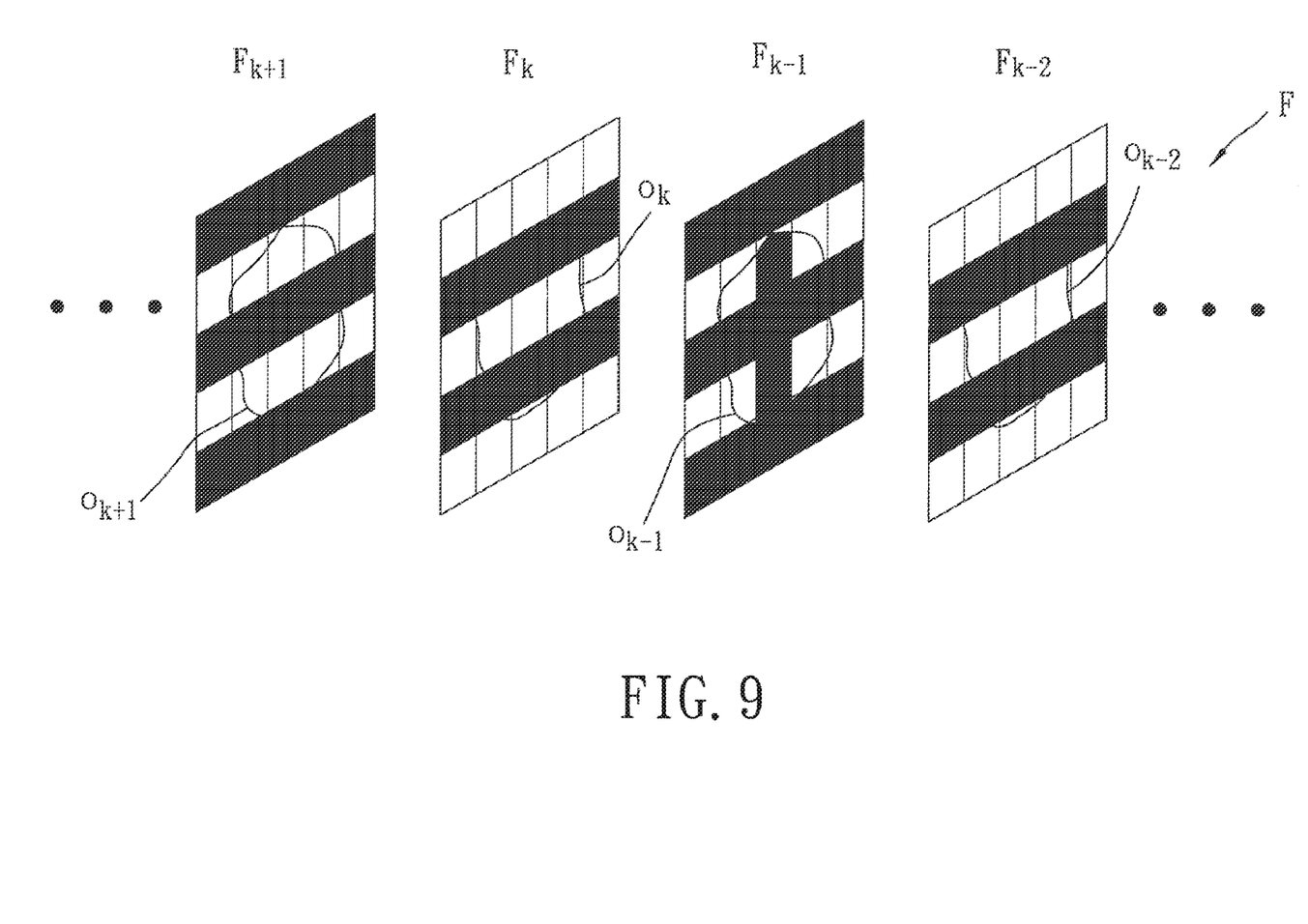
FIG. 9 is a schematic diagram of a field sequence.

Referring to FIG. 9, a consecutive field sequence (F) is formed by interposing a top field, such as field ($F_{k-2}$) or field ($F_k$), between a pair of bottom fields, such as fields ($F_{k-1}$) and ($F_{k+1}$).

Figure 10:
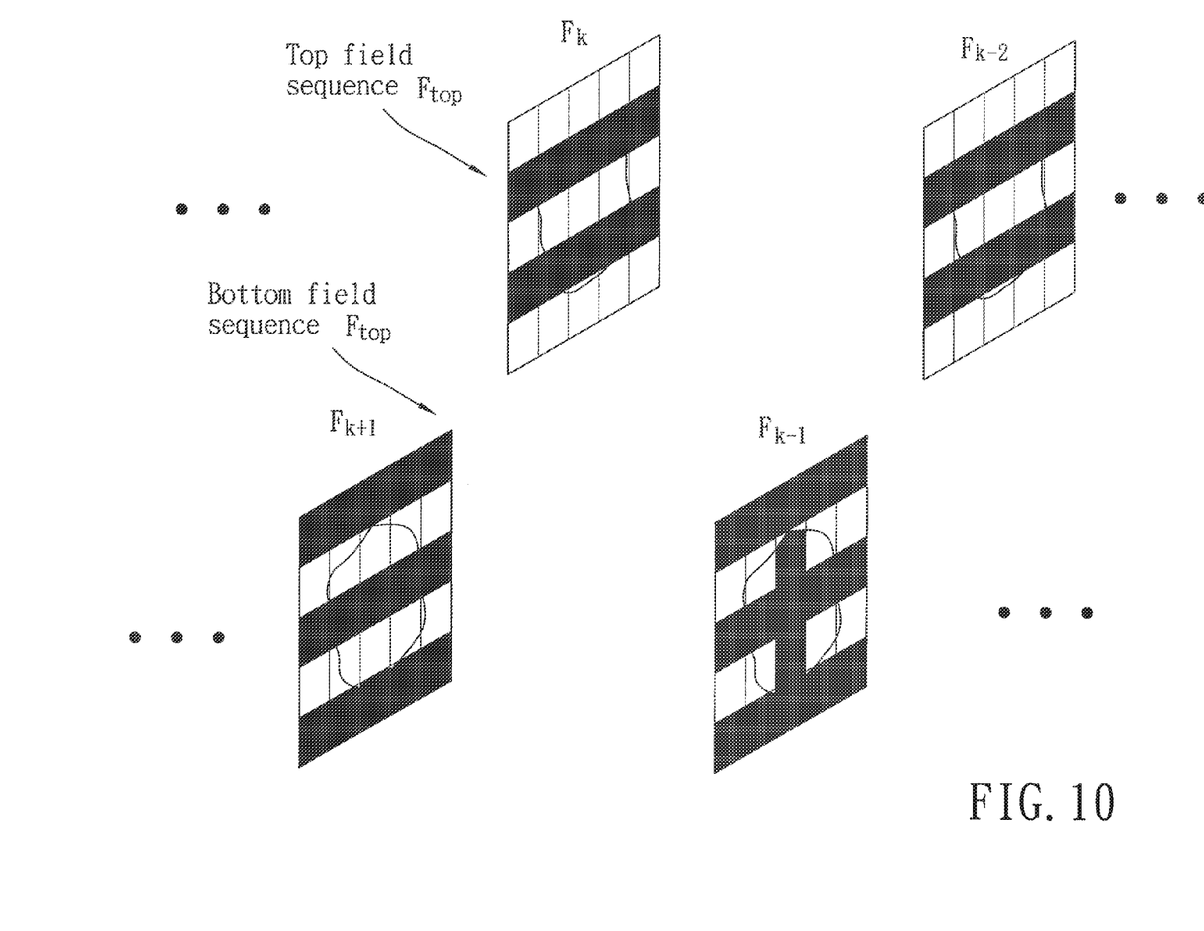
FIG. 10 is a schematic diagram of an upper field sequence and a lower field sequence.

Similar to the first preferred embodiment, the present image is a kth field (or a (k+1)th field), and the previous image is a (k−2)th field (or a (k−1)th field). Therefore, referring to FIG. 10, after the top field sequence ($F_{top}$) and the bottom field sequence ($F_{bot}$) are split into two independent field sequences, the image processing apparatus of this invention can be used to perform noise determination. For example, the field ($F_k$) of the top field sequence ($F_{top}$) is the present image and the field ($F_{k-2}$) thereof is the previous image. Similarly, the field ($F_{k+1}$) of the bottom field sequence ($F_{bot}$) is the present image and the field ($F_{k-1}$) thereof is the previous image. Subsequently, the top field sequence ($F_{top}$) and the bottom field sequence ($F_{bot}$) can be processed separately by two image processing apparatuses in a parallel manner, or a single image processing apparatus may be used to perform processing consecutively of the top field sequence ($F_{top}$) and the bottom field sequence ($F_{bot}$) under a time-sharing scheme.

Third Preferred Embodiment

The third preferred embodiment according to this invention differs from the first preferred embodiment in the manner in which the total pixel difference (D') is calculated. The total pixel difference (D') is calculated in this embodiment as shown in the following:

$$\text{total pixel difference } (D') = \left| \frac{\text{first\_output\_value}}{\text{first\_output\_value} + \text{second\_output\_value}} - 0.5 \right|$$

Fourth Preferred Embodiment

The fourth preferred embodiment according to this invention differs from the first preferred embodiment in the manner in which the total pixel difference (D") is calculated. The total pixel difference (D") is calculated in this embodiment as shown in the following:

$$\text{total pixel difference}(D'') = |\text{first output value} + \text{second output value}|$$

In addition, the manner in which the blended value (K') of each pixel difference is determined is altered as a result of the change in the calculation method of the total pixel difference (D"). This is outlined below.

Figure 11:
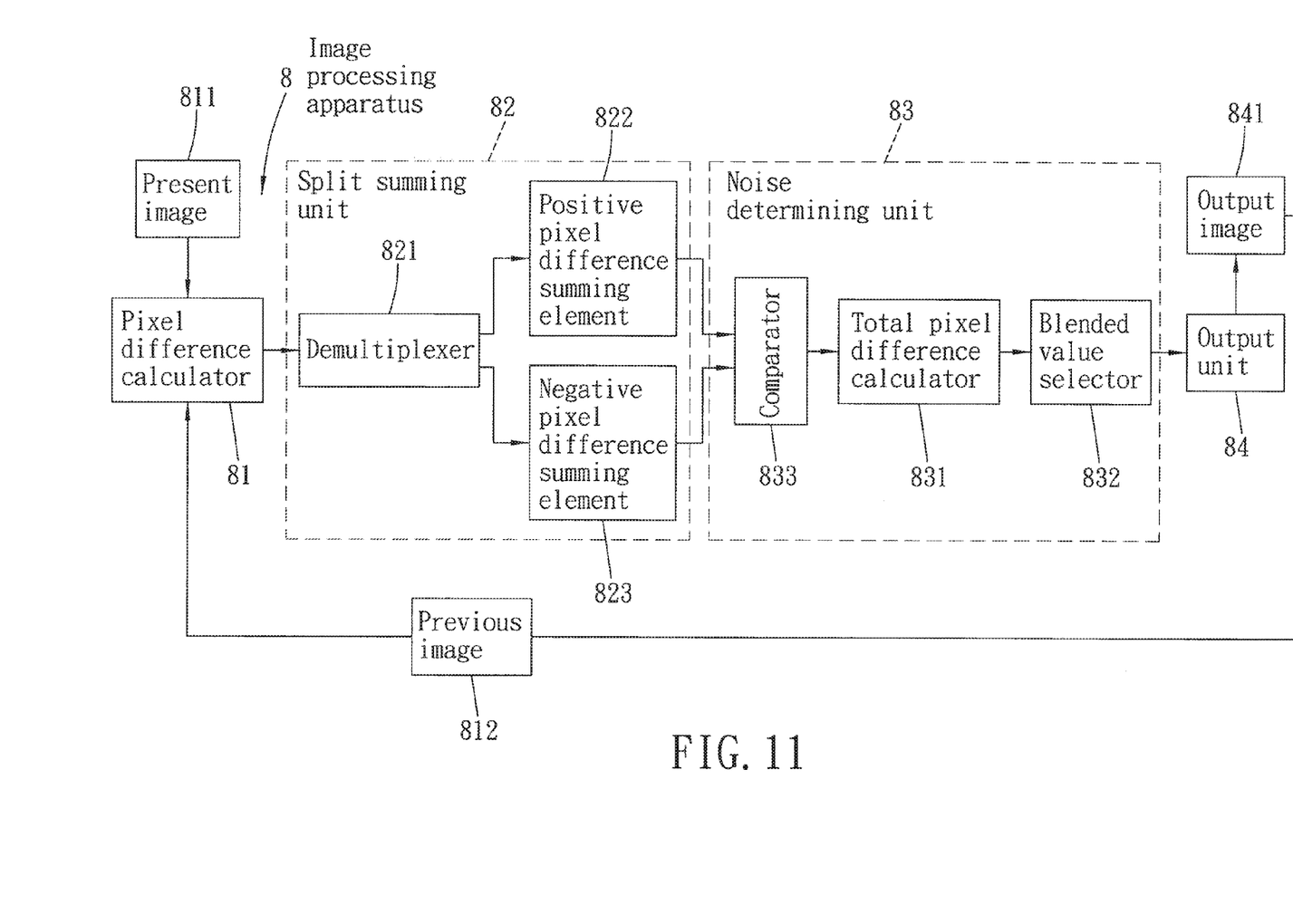
FIG. 11 is a schematic circuit block diagram of a fourth preferred embodiment of an image processing apparatus according to the present invention.

Four threshold values $th_1 \sim th_4$ are established in the blended value selector 832', where $th_1 < th_2 < th_3 < th_4$.

(I) When the first output value and the second output value of a pixel difference are both smaller than $th_1$, the blended value (K') of the pixel difference is set to 0.9.

(II) When the total pixel difference (D") of a pixel difference is smaller than $th_2$ and larger than $th_1$, the blended value (K') of the pixel difference is set to 0.8.

(III) When the total pixel difference (D") of a pixel difference" is larger than $th_2$ and smaller than $th_3$, the blended value (K') of the pixel difference is set to 0.5.

(IV) When the total pixel difference (D") of a pixel difference is larger than $th_3$ and smaller than $th_4$, the blended value (K') of the pixel difference is set to 0.2.

In the first, third, and fourth preferred embodiments, total pixel difference in this invention may be calculated using a function in which the first output value of each pixel difference and the corresponding second output value are used as variables, and the determination of the blended value may change according to the situation.

Fifth Preferred Embodiment

Referring to FIG. 11, the fifth preferred embodiment according to this invention differs from the first preferred embodiment in that the noise determining unit 83 further includes a comparator 833. The comparator 833 receives the first output value and the second output value of each pixel difference output from the split summing unit 82, and compares the first output value with a first threshold value and a second threshold value, in which the first threshold value is larger than the second threshold value, and similarly, compares the second output value with a third threshold value and a fourth threshold value, in which the third threshold value is larger than the fourth threshold value. When the first output value is larger than the first threshold value and the second output value is larger than the third threshold value, the comparator 833 determines that the pixel difference is caused by a moving image, and thereby sets the blended value (K") of the pixel difference to be a number approaching 0, such as K"=0.2, after which the comparator 833 outputs the blended value (K") to the output unit 84. Therefore, the first output value and the second output value are very large numbers, which indicates that most pixel differences in the sampling window of the pixel difference have large values, and hence, that the pixel may be a part of a moving object.

When the first output value is smaller than the second threshold value and the second output value is smaller than the fourth threshold value, the comparator 833 determines that the pixel difference is caused by signal noise, and thereby sets the blended value (K") of the pixel difference to be a number approaching 1, such as K"=0.8, after which the comparator 833 outputs the blended value (K") to the output unit 84. Therefore, the first output value and the second output value are very small numbers, which indicates that most pixel differences in the sampling window of the pixel difference have small values, and hence, that the pixel may have been subjected to noise interference.

If the comparator 833 does not make any of the above two determinations, the first output value and the second output value of the pixel difference are transmitted to the total pixel difference calculator 831 for calculation of the total pixel difference (D) of the pixel difference and determination of a corresponding blended value (K").

In the fifth preferred embodiment, in contrast with the first preferred embodiment, when the first output value and the second output value of each pixel difference are either very large or small, the image processing apparatus 8 of this preferred embodiment is able to more quickly determine whether the pixel difference is caused by a moving image or noise, and can quickly determine a better blended value (K").

Sixth Preferred Embodiment

Figure 12:
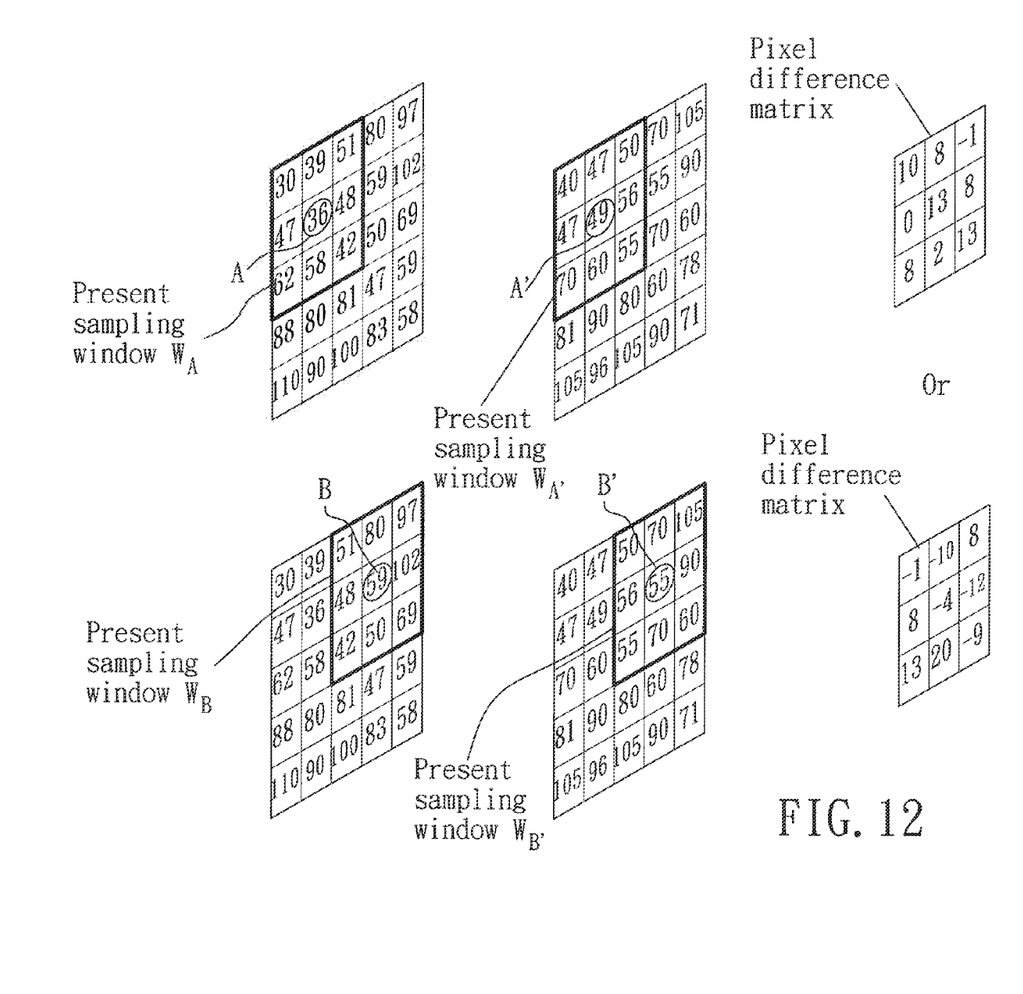
FIG. 12 is a schematic diagram used to describe an example of pixel difference matrix calculation in the sixth preferred embodiment of an image processing apparatus according to the present invention.

The sixth preferred embodiment according to this invention is similar to the first preferred embodiment, but differs therewith in the implementation of the pixel difference calculator 81. In the sixth preferred embodiment, the pixel difference calculator 81 establishes a current sampling window using each pixel in the present image 811 as a center point, in which the size of the sampling window can be a predetermined value of m×n or set by a user. At the same time, the pixel difference calculator 81 establishes a previous sampling window using each pixel of the previous image 812 as a center point. Subsequently, pixel value difference calculation is performed between the present sampling window of each pixel and the previous sampling window of a pixel at a corresponding location to thereby calculate a corresponding pixel difference, after which all the pixel differences are collected to form a pixel difference matrix.

As shown in FIG. 12, the pixels A, B have current sampling windows $W_A$, $W_B$ and previous sampling windows $W_{A'}$, $W_{B'}$, respectively. The pixel difference matrices corresponding to the pixels A, B are obtained from difference calculation of the current sampling window $W_A$ and the previous sampling window $W_{A'}$, and the current sampling window $W_B$ and the previous sampling window $W_{B'}$, respectively. The split summing unit 82 of this embodiment adds all the pixel differences contained in all the obtained pixel difference matrices according to the signs thereof so as to generate the first and second output values.

Preferred Embodiment of Image Processing Method

Figure 13:
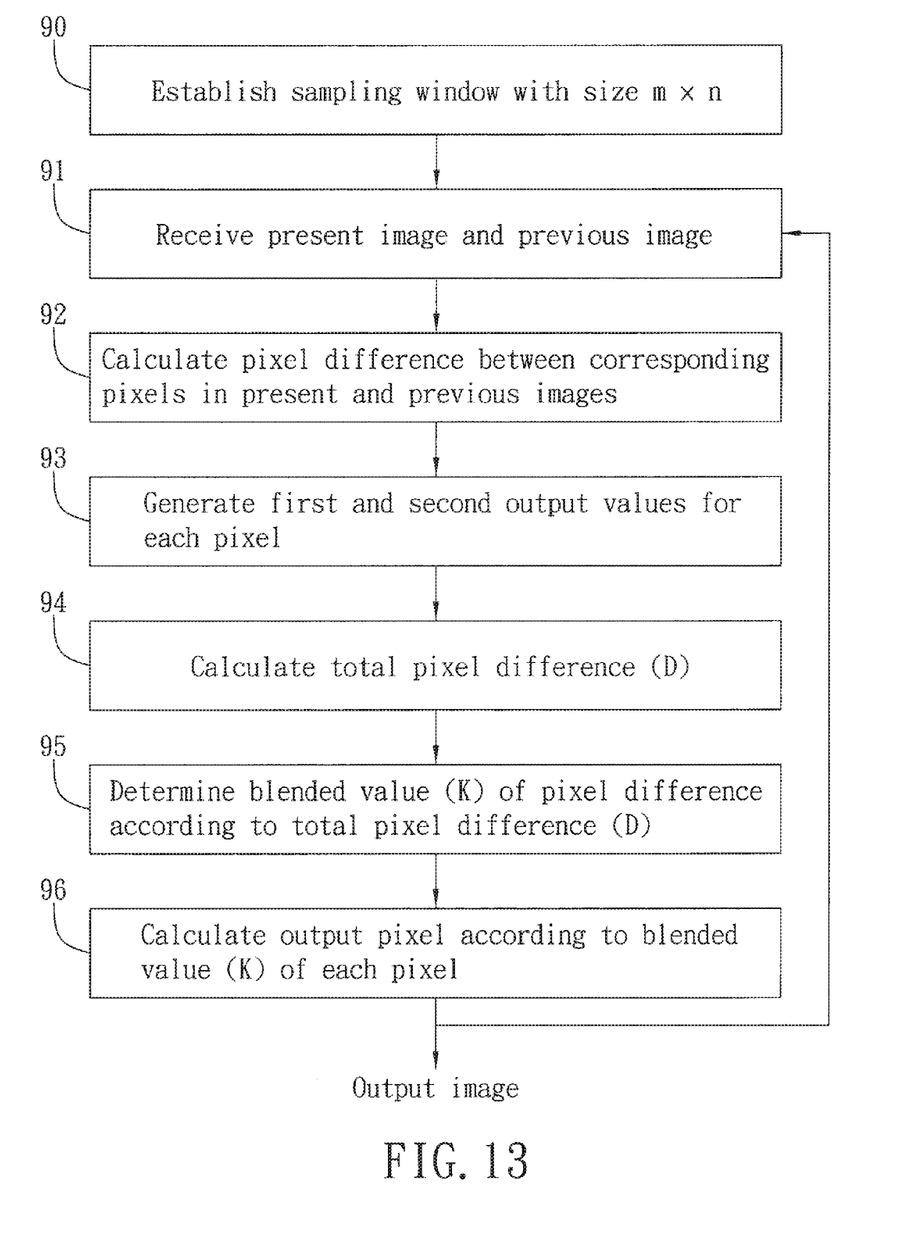
FIG. 13 is a flowchart of the preferred embodiment of an image processing method according to the present invention.

Referring to FIG. 13, the preferred embodiment of an image processing method according to this invention is used to determine whether an error between present and previous images is caused by noise or a moving object in the images. The image processing method includes the steps as outlined below.

In step 90, a sampling window with a size m×n is established.

In step 91, a present image and a previous image are received, in which the present image is a kth frame (or a kth field) and the previous image is a (k−1)th frame (or a (k−1)th field).

In step 92, pixel differences are calculated between pixels at corresponding locations in the present image and the previous image, and all the pixel differences are collected so as to form a pixel difference matrix of a dimension that is identical to that of the present image or the previous image.

In step 93, using each pixel difference as a center point, a corresponding sampling window is established, after which a first output value is generated by adding up those of the positive pixel differences in the same sampling window, and a second output value is generated by adding up those of the negative pixel differences in the same sampling window.

In step 94, a total pixel difference (D) is calculated using any of the methods disclosed in the foregoing embodiments. However, the present invention is not limited with respect to the method used to calculate the total pixel difference (D).

In step 95, a blended value (K) of the pixel difference is determined according to the magnitude of the total pixel difference (D), in which the determination of the blended value (K) is performed by any of the methods disclosed in the foregoing embodiments.

In step 96, an output pixel is calculated according to the blended value (K) of each pixel, and after the output pixel corresponding to each pixel is calculated, the output pixels are collected to form an output image is formed, after which feedback of the output image is performed for use as a previous image in a subsequent calculation. The formula used to calculate the output pixel is as follows:

$$\text{output pixel} = \text{pixel value corresponding to present image} \times (1-K) + \text{pixel value corresponding to previous image} \times K$$

It is to be noted that, as described with reference to the fifth preferred embodiment, before step 94, a determination may be made quickly using the first and second output values whether the pixel difference is caused by noise or a moving image.

Moreover, it is to be noted that step 92 may be performed as described with reference to the sixth preferred embodiment, in which a pixel difference matrix is calculated according to sampling windows, and the size of the pixel difference matrix is the same as the sampling window but not the same as the present image. Further, step 93 may be performed such that the pixel differences contained in the pixel difference matrices are added according to the signs thereof so as to generate the first and second output values.

In sum, in an image series, when there is a moving object in previous and subsequent images, the image processing apparatus and method of this invention are capable of differentiating between whether such a phenomenon is the result of object movement or noise interference. Therefore, the present invention makes it possible to minimize performing noise interference processing in the situation where object movement is mistaken for noise. That is, the present invention minimizes exacerbation of error produced by performing noise interference processing when the cause of differences in pixel values between present and previous images is mistaken for noise interference rather than for dynamic imaging.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An image processing apparatus comprising:
    a pixel difference calculator receiving a present image having a plurality of first pixels and a previous image having a plurality of second pixels, said pixel difference calculator calculating pixel differences between the first pixels and the second pixels which positions corresponding to the first pixels, and outputting a plurality of pixel difference values, the pixel difference values including a plurality of positive pixel difference values and a plurality of negative pixel difference values;
    a summing unit coupled to said pixel difference calculator, and for obtaining a first output value by adding up those of the positive pixel difference values and for obtaining a second output value by adding up those of the negative pixel difference values;
    a determining unit coupled to said summing unit includes a total pixel difference calculator for calculating a total pixel difference, which indicates a noise level, according to the first and second output values, and outputting a blended value, wherein the blended value correlates to a level of noise interference; and
    an output unit coupled to said determining unit, and for adding up those of weights of pixels at the same positions of the present image and the previous image according to the blended value to generate an output image, wherein the blended value is inversely related to the total pixel difference.

2. The image processing apparatus of claim 1, wherein said determining unit includes a blended value selector for selecting the blended value according to the noise level.

3. The image processing apparatus of claim 1, wherein said summing unit establishes a sampling window, and generates the first output value by adding up those of the positive pixel difference values in the sampling window from among all the received plurality of pixel difference values, and further generates the second output value by adding up those of the negative pixel difference values in the sampling window from among all the received plurality of pixel difference values.

4. The image processing apparatus of claim 1, wherein said determining unit includes a comparator for comparing the first and second output values with at least one threshold value so as to determine the blended value.

5. The image processing apparatus of claim 1, wherein said summing unit includes:
 a positive pixel difference summing element for adding up those of the positive pixel differences so as to generate the first output value; and
 a negative pixel difference summing element for adding up those of the negative pixel difference so as to generate the second output value;
 wherein said negative pixel difference summing element performs an unsigned operation.

6. The image processing apparatus of claim 1, wherein the total pixel difference is the absolute value of the difference between the first output value and the second output value.

7. An image processing method comprising:
 receiving a present image having a plurality of first pixels and a previous image having a plurality of second pixels;
 calculating pixel differences between the first pixels and the second pixels which positions are corresponding to the first pixels, and outputting a plurality of pixel difference values, the pixel difference values including a plurality of positive pixel difference values and a plurality of negative pixel difference values;
 obtaining a first output value by adding up those of the positive pixel difference values and a second output value by adding up those of the negative pixel difference values;
 calculating a total pixel difference, which indicates a noise level, according to the first and second output values, and outputting a blended value, wherein the blended value correlates to a level of noise interference; and
 adding up those of weights of pixels at the same positions of the present image and the previous image according to the blended value to generate an output image, wherein the blended value is inversely related to the total pixel difference.

8. The image processing method of claim 7, wherein obtaining the first output value and the second output value includes:
 establishing a sampling window, and generating the first output value by adding up those of the positive pixel difference values in the sampling window from among all the received plurality of pixel difference values, and further generating the second output value by adding up those of the negative pixel difference values in the sampling window from among all the received plurality of pixel difference values.

9. The image processing method of claim 7, wherein determining the noise level of the present image from the first output value and the second output value, and outputting the blended value includes:
 comparing the first and second output values with at least one threshold value so as to determine the blended value.

10. The image processing method of claim 7, wherein adding up those of the negative pixel difference values is an unsigned operation.

11. The image processing method of claim 7, wherein the total pixel difference is the absolute value of the difference between the first output value and the second output value.

12. An image processing method comprising the steps of:
 receiving a present image having a first pixel and a previous image having a second pixel, wherein the position of the second pixel corresponds to the position of the first pixel;
 calculating a pixel difference between the first pixel and the second pixel and outputting a pixel difference value, which indicates a noise level;
 determining a blended value (K) based on at least the pixel difference value, wherein the blended value (K) correlates to a level of noise interference; and
 generating an output pixel by weighting the first pixel and the second pixel according to the blended value (K) and summing the weighted first pixel and the weighted second pixel to obtain the value of the output pixel, wherein the blended value is inversely related to the pixel difference value.

\* \* \* \* \*